US 011226915B2

(12) United States Patent
Kiyota et al.

(10) Patent No.: US 11,226,915 B2
(45) Date of Patent: Jan. 18, 2022

(54) DATA TRANSFER SYSTEM

(71) Applicant: Hitachi, Ltd., Tokyo (JP)

(72) Inventors: Yuusaku Kiyota, Tokyo (JP); Hideaki Monji, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 17/016,911

(22) Filed: Sep. 10, 2020

(65) Prior Publication Data

US 2021/0255977 A1 Aug. 19, 2021

(30) Foreign Application Priority Data

Feb. 19, 2020 (JP) .............................. JP2020-026671

(51) Int. Cl.
*G06F 13/28* (2006.01)
*G06F 12/0804* (2016.01)
*G06F 13/16* (2006.01)

(52) U.S. Cl.
CPC .......... *G06F 13/28* (2013.01); *G06F 12/0804* (2013.01); *G06F 13/1668* (2013.01); *G06F 2212/1008* (2013.01)

(58) Field of Classification Search
None
See application file for complete search history.

(56) References Cited

U.S. PATENT DOCUMENTS

| | | | | |
|---|---|---|---|---|
| 4,525,780 A | * | 6/1985 | Bratt | G01R 31/318505 711/163 |
| 8,327,187 B1 | * | 12/2012 | Metcalf | G06F 12/123 714/10 |
| 10,409,524 B1 | * | 9/2019 | Branover | G06F 3/0634 |
| 2003/0140274 A1 | * | 7/2003 | Neumiller | H04L 1/22 714/24 |
| 2007/0011398 A1 | * | 1/2007 | Van Niekerk | G06F 13/28 711/111 |
| 2008/0195792 A1 | * | 8/2008 | Teil | G06F 13/4072 710/313 |
| 2011/0119526 A1 | * | 5/2011 | Blumrich | G06F 9/30072 714/16 |
| 2015/0091927 A1 | * | 4/2015 | Cote | G06T 1/20 345/547 |
| 2015/0106560 A1 | * | 4/2015 | Perego | G06F 12/0246 711/105 |
| 2015/0281126 A1 | * | 10/2015 | Regula | H04L 67/26 709/212 |
| 2018/0052632 A1 | * | 2/2018 | Takada | G11C 7/1078 |

(Continued)

FOREIGN PATENT DOCUMENTS

JP 2005-182538 A 7/2005

*Primary Examiner* — Henry Tsai
*Assistant Examiner* — Christopher A Bartels
(74) *Attorney, Agent, or Firm* — Mattingly & Malur, PC (57) ABSTRACT

A data transfer system including a first memory and a processor includes a second memory and a DMA controller. The processor performs RMW on data which has a size less than a cache line size and in which a portion of a cache line (a unit area of the first memory) is a write destination. Output target data is transferred from an I/O device to the second memory. Thereafter, the DMA controller transfers the output target data from the second memory to the first memory in one or a plurality of transfer unit sizes by which the number of occurrences of RMW is minimized.

9 Claims, 8 Drawing Sheets

(56) References Cited

U.S. PATENT DOCUMENTS

| | | | |
|---|---|---|---|
| 2018/0165201 A1* | 6/2018 | Hashemi | G06F 12/0893 |
| 2019/0140838 A1* | 5/2019 | Bernat | H04L 9/3247 |
| 2019/0187894 A1* | 6/2019 | Benisty | G06F 3/061 |
| 2019/0196745 A1* | 6/2019 | Persson | G06F 3/0659 |
| 2019/0205153 A1* | 7/2019 | Niestemski | G06F 9/45558 |
| 2019/0385057 A1* | 12/2019 | Litichever | H04L 63/14 |

* cited by examiner

FIG. 1

COMPARATIVE EXAMPLE

| STEP# | PROTOCOL | TRANSFER PARAMETER | | |
|---|---|---|---|---|
| | | SOURCE ADDRESS | DESTINATION ADDRESS | TRANSFER SIZE |
| S601 | NVMe | ADDRESS P | ADDRESS Q | SIZE R |
| S602 | PCIe | ADDRESS P | ADDRESS Q | SIZE R |
| S603 | NVMe | NONE | | |
| S604 | Local | ADDRESS Q | ADDRESS M | SIZE R |
| S605 | - | ADDRESS Q | - | SIZE R |
| S606 | - | NONE | | SIZE R |
| S607 | PCIe | ADDRESS Q | ADDRESS M | SIZE R |
| S608 | - | NONE | | |

DATA TRANSFER SYSTEM

CROSS-REFERENCE TO PRIOR APPLICATION

This application relates to and claims the benefit of priority from Japanese Patent Application number 2020-26671, filed on Feb. 19, 2020 the entire disclosure of which is incorporated herein by reference.

BACKGROUND

The present invention generally relates to a technique for transferring data output from an input/output (I/O) device.

In a case where the size of data output from an I/O device is different from the size of a unit area of a transfer destination memory of the data, read-modify-write (hereinafter, RMW) is performed. RMW includes: reading data from a unit area, which is a write destination; modifying a portion of the data to data to be written; and writing the modified data in the unit area, which is a write destination.

When RMW occurs frequently, data transfer performance deteriorates.

As a data transfer technique for reducing the frequent occurrence of RMW, for example, a technique disclosed in Reference 1 is known. According to Reference 1, in a case where the size of data to be transferred is different from an integer multiple of the width of data to be written into a memory, a DMA controller adds dummy data and transfers the data, so that the size of the entire data to be transferred is defined as a data width unit.

Reference 1: Japanese Patent Application Publication No. 2005-182538

SUMMARY

According to the technique of Reference 1, in a case where DMA-transfer of the entire first data, obtained by adding first dummy data to first write target data, to a memory is performed, while, DMA-transfer of the entire second data, obtained by adding second dummy data to the next second write target data, to the memory is performed, a portion of the first write target data may be destroyed (overwritten) by the second dummy data, depending on a relationship between a transfer destination address of the first write target data and a transfer destination address of the second write target data.

In order to avoid such a problem, according to the technique of Reference 1, a method of switching a transfer mode from a first transfer mode, in which additional transfer of dummy data is performed, to a second transfer mode, in which additional transfer of dummy data is not performed, is conceivable. However, the switching of a transfer mode is static switching based on a mode register. For this reason, the technique disclosed in Reference 1 is less practical.

In addition, vendors of a plurality of I/O devices are multiple vendors, thus it is expected that quality risk is reduced. Specifically, for example, in a case where a defect rate of an I/O device of a certain vendor is high, the degree of dependence on the I/O device from the vendor may be reduced while the degree of dependence on an I/O device from another vendor may be increased, and as a result quality is expected to be maintained. For this reason, the plurality of I/O devices from multiple vendors may be adopted in a system. When vendors of I/O devices are different from one another, data transfer characteristics of the I/O devices may be different from one another. According to the technique of Reference 1, a DMA controller is required for each of the I/O devices. For this reason, each of the DMA controllers has to be a dedicated machine, with the compatibility thereof with the I/O device from the vendor being taken into account. Moreover, as the number of DMA controllers increases, the number of I/O devices also increases, and this leads to a greater number of components. For these reasons, the technique disclosed in Reference 1 is not very practical.

A data transfer system includes one or a plurality of I/O devices, a first memory providing an address space having a first memory address, a processor that writing data into the first memory in units of cache lines (a unit area of the first memory), a second memory providing an address space having a second memory address, and a direct memory access (DMA) controller performing DMA-transfer of data. The processor performs RMW (a process of reading data having a cache line size from the entire region of a cache line, and modifying a portion of the data having the cache line size to data having a size less than the cache line size, and moreover writing in the cache line the modified data having the cache line size) on the data which has a size less than the cache line size and in which a portion of the cache line is a write destination. The processor transmits to a source I/O device, which is a data output source of data, among one or a plurality of I/O devices, a first transfer instruction, which designate transfer of output target data from the source I/O device to the second memory. The DMA controller transfers the output target data, which is transferred from the source I/O device to the second memory in response to the first transfer instruction, from the second memory to the first memory in one or a plurality of transfer unit sizes, by which the number of occurrences of RMW is minimized, in response to a second transfer instruction for designating the transfer of the output target data from the second memory to the first memory.

According to the present invention, it is possible to reduce the number of occurrences of RMW in the entire system without adding dummy data or without including a DMA controller for each I/O device even when a plurality of I/O devices from multiple vendors are provided.

DESCRIPTION OF EMBODIMENTS

In the following description, a "communication interface apparatus" may be one or more communication interface devices. One or more communication interface devices may be one or more communication interface devices of the same type (for example, one or more network interface cards (NIC)) or may be two or more communication interface devices of different types (for example, an NIC and a host bus adapter (HBA)).

Further, in the following description, a "memory" may be one or more memory devices.

Further, in the following description, a "storage device" may be typically a non-volatile storage device (for example, an auxiliary storage device), and specifically, may be, for example, a hard disk drive (HDD) or a solid state drive (SSD).

Further, in the following description, a "processor" may be one or more processor devices. At least one processor device may be typically a microprocessor device such as a central processing unit (CPU), but may be any of other types of processor devices such as a graphics processing unit (GPU). At least one processor device may be a single core or may be multiple cores. At least one processor device may be a processor core. At least one processor device may be a processor device in a broad sense such as a circuit which is an aggregate of gate arrays in a hardware description language for performing a portion or the entirety of processing (for example, a field-programmable gate array (FPGA), a complex programmable logic device (CPLD), or an application specific integrated circuit (ASIC)).

Further, in the following description, common reference numerals and signs among reference numerals and signs may be used in a case where description is given without distinguishing between the same type of elements, and different reference numerals and signs may be used in a case where description is given by distinguishing between the same type of elements.

Further, in the following description, a storage device is adopted as an example of an I/O device, and a storage system is adopted as an example of a data transfer system.

Figure 1:
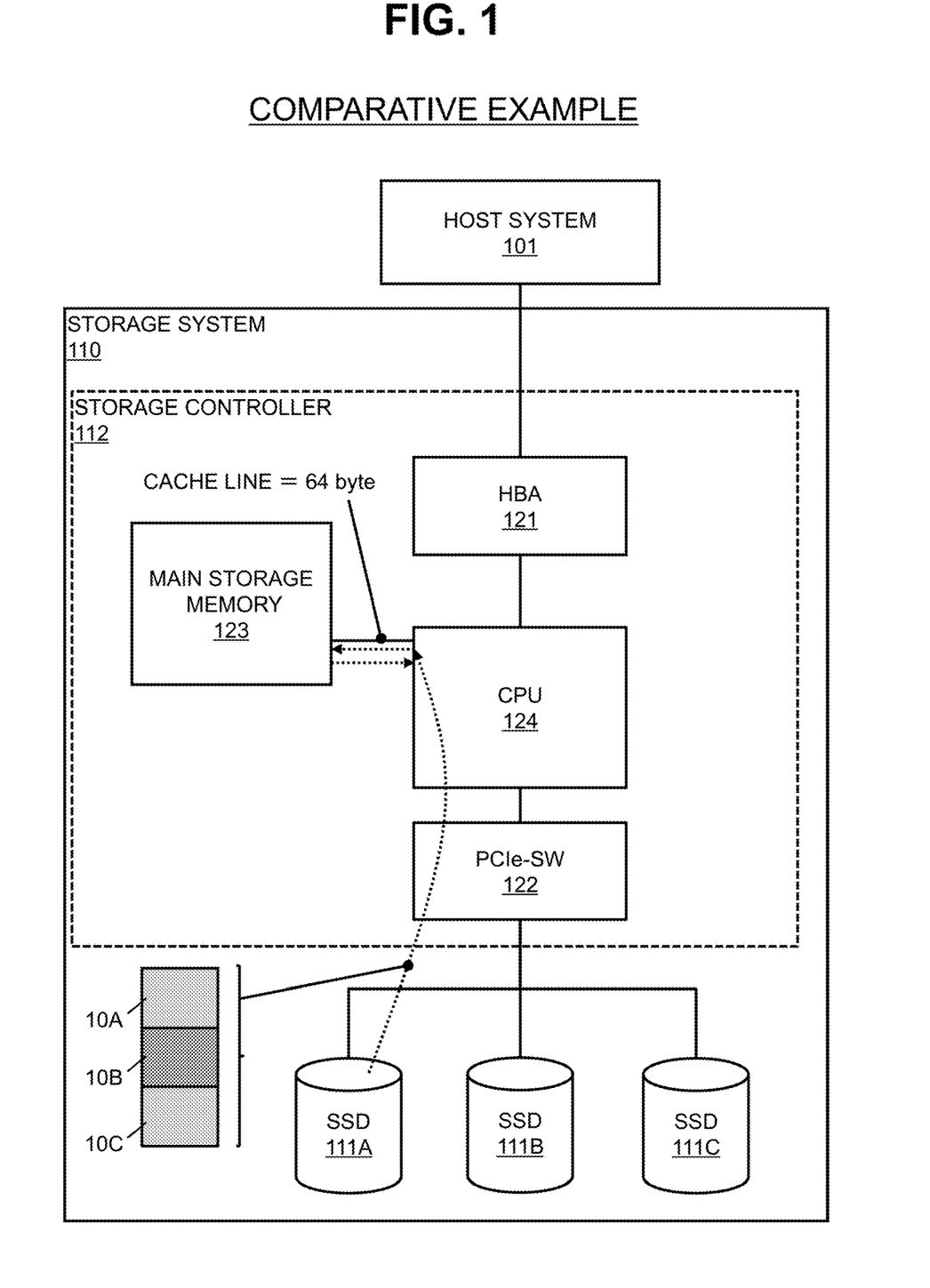
FIG. 1 shows a configuration of an overall system according to a comparative example.
Figure 2:
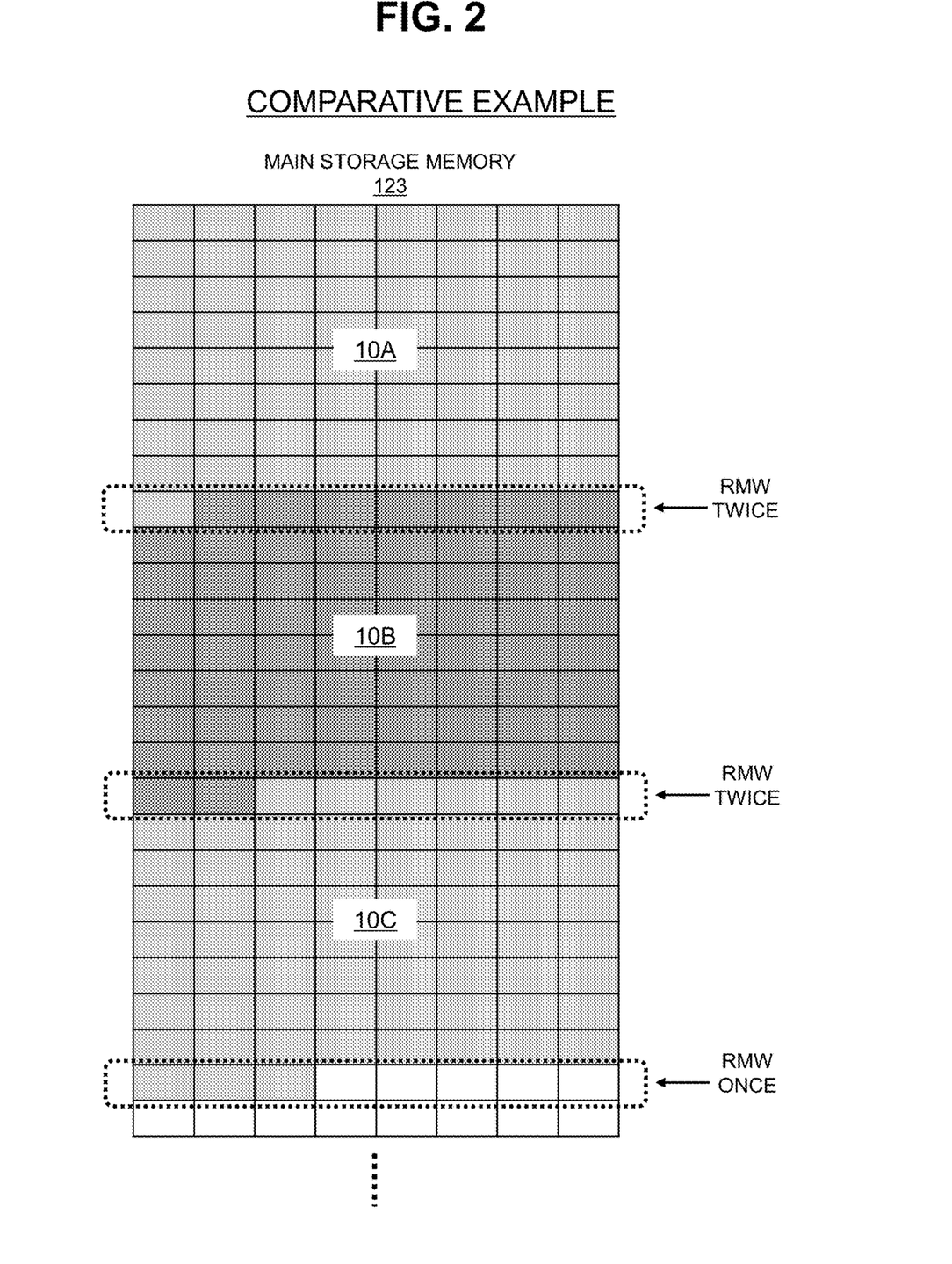
FIG. 2 shows an example of data transfer (data transfer from a CPU to a main storage memory) according to the comparative example.

FIG. 1 shows a configuration of an overall system according to a comparative example. FIG. 2 shows an example of data transfer (data transfer from a CPU to a main storage memory) according to the comparative example.

A storage system 110 includes a plurality of SSDs 111 and a storage controller 112 that controls I/O of data with respect to the plurality of SSDs 111. The storage controller 112 reads data according to a read request from one or more SSDs 111 and returns the read data to a host system 101 in response to the read request received from the host system 101.

The plurality of SSDs 111 include, for example, a plurality of SSDs 111A to 111C from different vendors (that is, from multiple vendors). The SSDs 111A to 111C have different data transfer characteristics. Hereinafter, for convenience of description, a vendor of the SSD 111A will be referred to as a "vendor A," a vendor of the SSD 111B will be referred to as a "vendor B," and a vendor of the SSD 111C will be referred to as a "vendor C."

The storage controller 112 includes an HBA 121 to which the host system 101 is connected, a PCIe-SW 122 to which the plurality of SSDs 111 are connected, a main storage memory 123, and a CPU 124 which is connected to the HBA 121, the PCIe-SW 122, and the main storage memory 123. In the storage controller 112, the HBA 121, the PCIe-SW 122, the main storage memory 123, and the CPU 124 are connected to a PCIe bus (not shown). In the storage controller 112, data is transferred through the PCIe bus.

The CPU 124 transmits a transfer instruction (read instruction) for designating the reading (transfer) of read target data from the SSD 111 which is a read source to the main storage memory 123 to the SSD 111 which is a read source. The transfer instruction has parameters such as an address range of a transfer source (for example, a head address and a data size) and an address of a transfer destination. The SSD 111 which is a read source transfers data in the address range of the transfer source to the main storage memory 123 to which a transfer destination address belongs in response to the transfer instruction. The data which is output from the SSD 111 is transferred to the main storage memory 123 through the PCIe-SW 122. A memory adopted as the main storage memory 123 is typically a volatile memory such as a dynamic random access memory (DRAM), but a non-volatile memory may be adopted instead of or in addition to the volatile memory.

A cache line which is a unit area of the main storage memory 123 is managed by the CPU 124. Data is written in the main storage memory 123 in units of cache lines. The cache line is constituted by a plurality of sub-blocks (an example of sub-unit areas). According to the example shown in FIG. 2, one row is equivalent to a cache line. The cache line is constituted by eight sub-blocks. When the size of one sub-block is set to be 8 bytes, one cache line has a size of 64 bytes.

In a case where the head and the tail of data written in a cache line are respectively consistent with a start address and a termination address of the cache line, the data is written in the cache line without RMW. On the other hand, in a case where the head of data written in a cache line is not consistent with a start address of the cache line or in a case where the tail of the data is not consistent with a termination address of the cache line (that is, in a case where a portion of the cache line is a write destination), RMW occurs for the data having a size less than a cache line size. That is, the CPU 124 reads data having a cache line size from the entire region of the cache line, modifies a portion of the data having the cache line size to the data having a size less than the cache line size, and writes the modified data having a cache line size in the cache line.

Although not shown in the drawing, it is assumed that a transfer unit size of data is an integer multiple of a cache line in data transfer characteristics of the SSD 111C of the vendor C. For example, it is assumed that data of 1,560 bytes is transferred from a continuous address range of the SSD 111C. It is assumed that an address of a transfer destination of the data is a start address of the cache line, and the data of 1,560 bytes is transferred in units of an integer multiple of a cache line size. In this case, 1,536 bytes excluding data of 24 bytes of a tail is an integer multiple of (to be exact, 24 times) a cache line size of 64 bytes, and thus it is considered that RMW occurs only for the data of 24 bytes of the tail.

However, a transfer unit size of data is not necessarily an integer multiple of a cache line in data transfer specifications of the SSDs 111 of all of the vendors. For example, as shown in FIG. 1, it is assumed that data of 1,560 bytes is transferred from a continuous address range of the SSD 111A of the vendor A, and a transfer unit size is 520 bytes. That is, data 10A of 520 bytes is transferred in first data transfer, the next data 10B of 520 bytes is transferred in second data transfer, and the last data 10C of 520 bytes is transferred in third data transfer. In this case, as shown in FIG. 2, RMW occurs in the transfer of each of the pieces of data 10A to 10C, and consequently, RMW occurs five times in total. Specifically, the first RMW occurs for data of 8 bytes of a tail in the transfer of the data 10A, the second RMW occurs for data of 56 bytes of a head in the transfer of the data 10B, and consequently, RMW occurs twice in total for a cache line which is a write destination of the data of 8 bytes and the data of 56 bytes. Similarly, the third RMW occurs for data of 16 bytes of a tail in the transfer of the data 10B, the fourth RMW occurs for data of 48 bytes of a head in the transfer of the data 10C, and consequently, RMW occurs twice in total for a cache line which is a write destination of the data of 16 bytes and the data of 48 bytes. Finally, the fifth RMW occurs for data of 24 bytes of a tail in the transfer of the data 10C.

As described above, according to the comparative example, a cache line deviation (the head of data is not consistent with a start address of a cache line, or the tail of data is not consistent with a termination address of a cache line) occurs many times due to data transfer characteristics of the SSD 111, and consequently, RMW occurs many times.

Further, in a case where the plurality of SSDs 111 include the SSDs 111A to 111C from multiple vendors, the frequency of occurrence of a cache line deviation, in other words, the frequency of occurrence of RMW, varies depending on data transfer characteristics of the SSDs 111A to 111C. As a result, when the plurality of SSDs 111 include a relatively large number of SSDs 111 having data transfer characteristics in which the frequency of occurrence of a cache line deviation is high or the frequency of such SSDs 111 serving as read sources is high, the throughput of the storage system 110 is reduced.

Consequently, in a first embodiment of the present invention, a storage system is mounted with an accelerator that absorbs differences in data transfer characteristics and optimizes a transfer unit size. Hereinafter, the first embodiment will be described. Meanwhile, in the following description, the same components as the components described in FIGS. 1 and 2 will be denoted by the same reference numerals and signs, and the description thereof will be omitted or simplified.

First Embodiment

Figure 3:
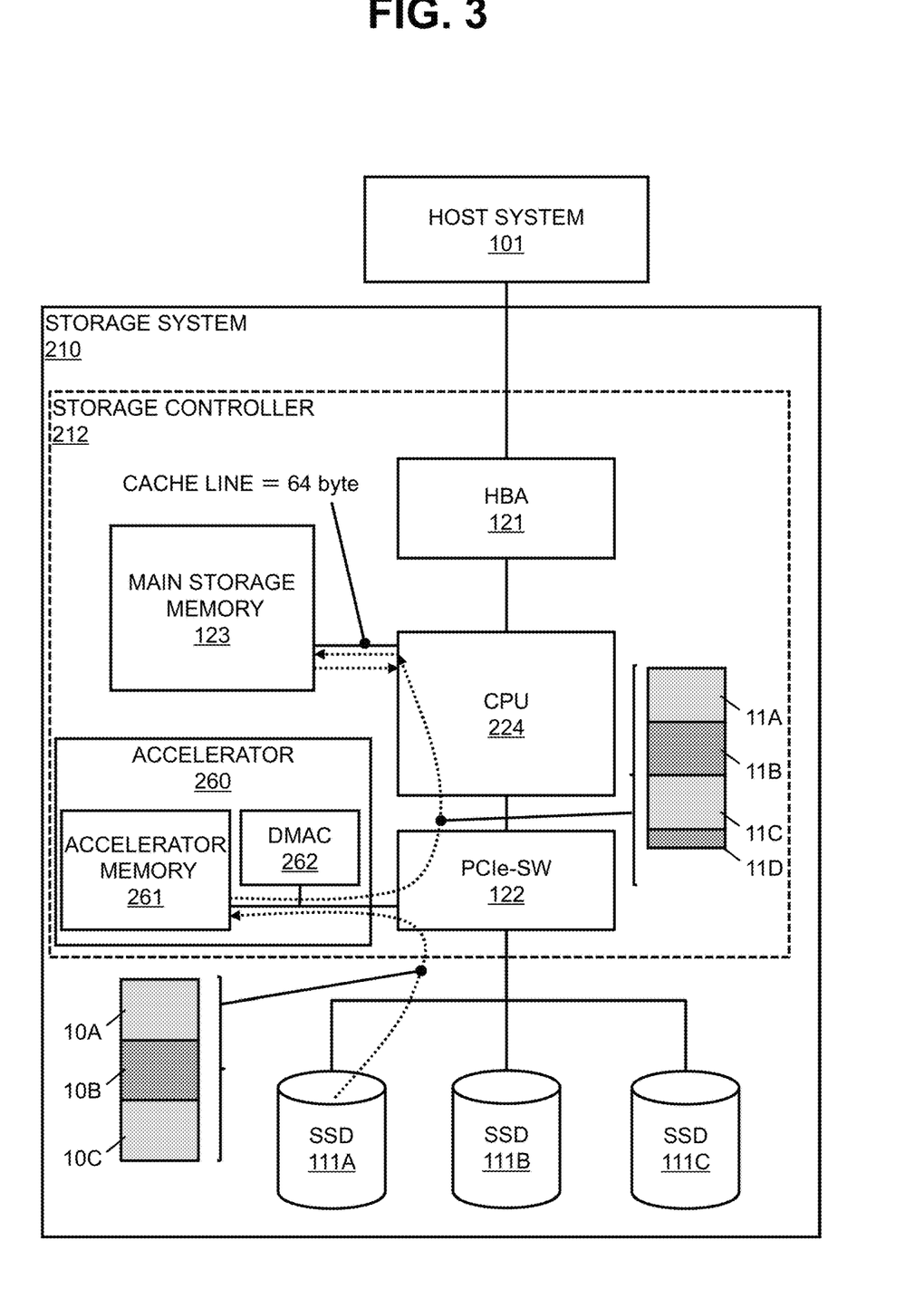
FIG. 3 shows a configuration of an overall system according to a first embodiment.
Figure 4:
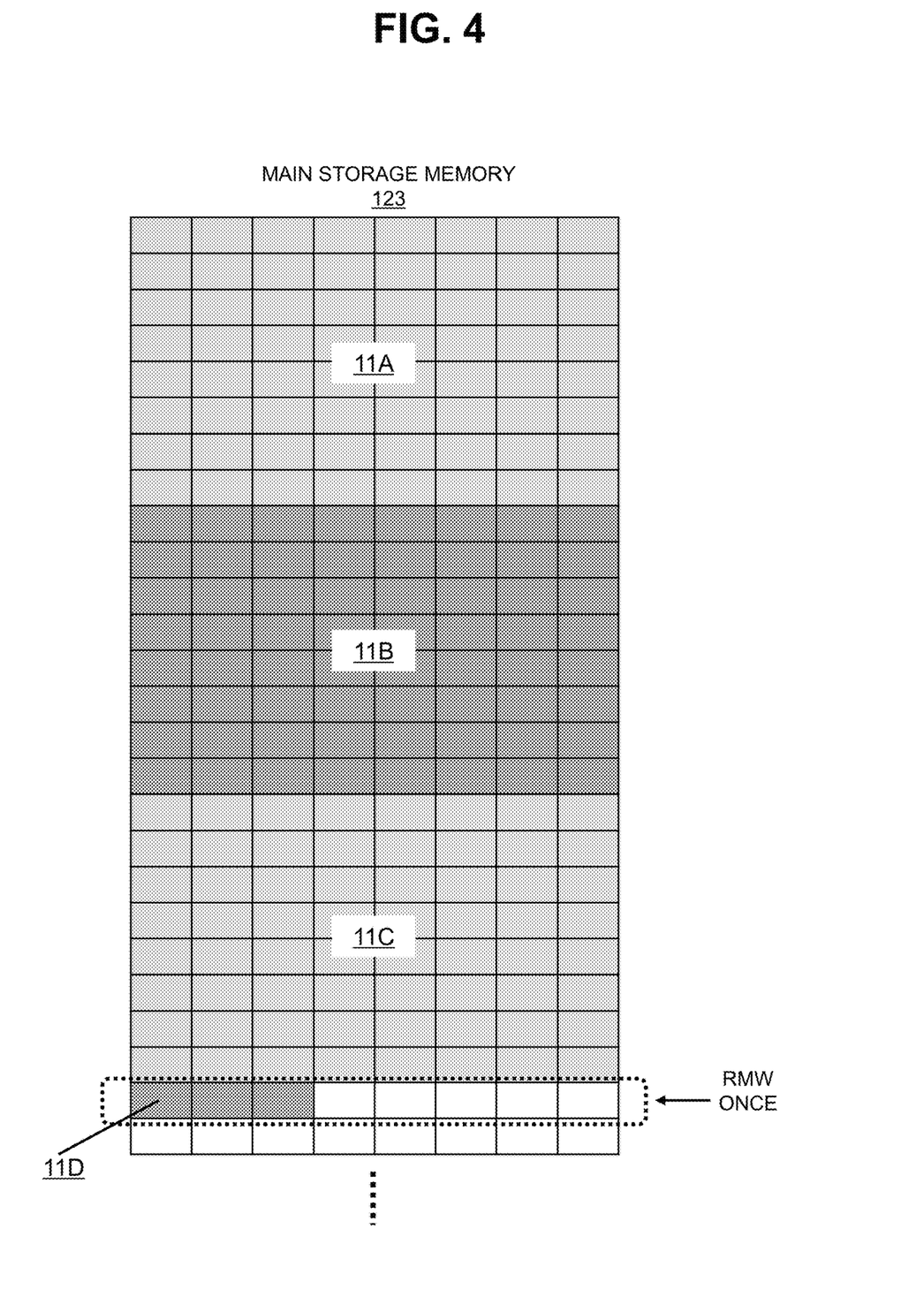
FIG. 4 shows an example of data transfer (data transfer from a CPU to a main storage memory) according to the first embodiment.

FIG. 3 shows a configuration of an overall system according to the first embodiment. FIG. 4 shows an example of data transfer (data transfer from a CPU to a main storage memory) according to the first embodiment.

An accelerator 260 is connected to the PCIe-SW 122. The accelerator 260 includes an accelerator memory 261 and a DMA controller (hereinafter, DMAC) 262. A memory adopted as the accelerator memory 261 is typically a volatile memory, but a non-volatile memory may be adopted instead of or in addition to the volatile memory. In addition, the accelerator memory 261 is an example of a second memory, and the second memory may be present outside the accelerator 260 (for example, the DMAC 262 may be the accelerator 260 itself). The second memory may be, for example, an external double data rate (DDR) memory of the accelerator 260 or may be a static random access memory (SRAM) or a high bandwidth memory (HBM) inside an ASIC or an FPGA.

In the first embodiment, data is transferred to the main storage memory 123 through the accelerator memory 261 from the SSD 111A. The data transfer from the SSD 111A to the accelerator memory 261 is performed by the SSD 111A with a transfer unit size according to data transfer characteristics of the SSD 111A, and the data transfer from the accelerator memory 261 to the main storage memory 123 is performed by the DMAC 262 with a transfer unit size according to data transfer characteristics in which the number of occurrences of RMW is minimized.

Specifically, for example, in a case where data of 1,560 bytes is transferred from a continuous address range of the SSD 111A, the data 10A to 10C of 520 bytes (a transfer unit size according to data transfer characteristics of the SSD 111A) is transferred to the accelerator memory 261 from the SSD 111A as the data of 1,560 bytes. Thereafter, the data 11A to 11C of 512 bytes and the data 11D of 24 bytes are transferred to the main storage memory 123 (an example of a first memory) from the accelerator memory 261 as the data of 1,560 bytes. As a result, as shown in FIG. 4, all of the data 11A to 11C is written in the main storage memory 123 without RMW occurring therein, and RWM occurs only for data of 24 bytes of a tail.

In this manner, in the first embodiment, two-stage transfer in which the accelerator 260 is interposed is adopted. That is, the accelerator 260 temporarily stores output target data, transferred in a transfer unit size according to data transfer characteristics of the SSD 111 which is a transfer source, in the accelerator memory 261 and then transfers the output target data to the main storage memory 123 from the accelerator memory 261 by the DMAC 262 in an optimal transfer unit size by which the number of occurrences of RMW is minimized. In other words, the accelerator 260 absorbs differences in data transfer characteristics of the SSD 111 by the accelerator memory 261 and transfers data from the accelerator memory 261 to the main storage memory 123 with optimal data transfer characteristics for minimizing the number of occurrences of RMW.

According to the first embodiment, it is possible to absorb variations in data transfer characteristics between the SSDs 111 and reduce the number of occurrences of RMW in the entire storage system 110 (in other words, it is possible to reduce performance deterioration potential due to a cache line deviation) without adding dummy data and including the DMAC 262 for each SSD 111 even when the plurality of SSDs 111A to 111C from multiple vendors are included.

In addition, according to the first embodiment, the accelerator 260 can absorb variations in data transfer characteristics between the SSDs 111, and thus it is not necessary to consider data transfer characteristics of the SSDs 111. The multi-vendor SSDs 111 are easily formed, and the number of vendors as options can be increased. In addition, the accelerator memory 261 and the DMAC 262 may be common to the plurality of SSDs 111. Thereby, it is not necessary to include the DMAC 262 for each SSD 111 even when the plurality of SSDs 111A to 111C from multiple vendors are included.

Meanwhile, data transfer from the accelerator memory 261 to the main storage memory 123 is DMA-transfer, and the CPU 224 can determine whether or not RMW is necessary from an access address and a transfer size. In a case where the CPU 224 determines that RMW is necessary, RMW is performed by the CPU 224.

Figure 5:
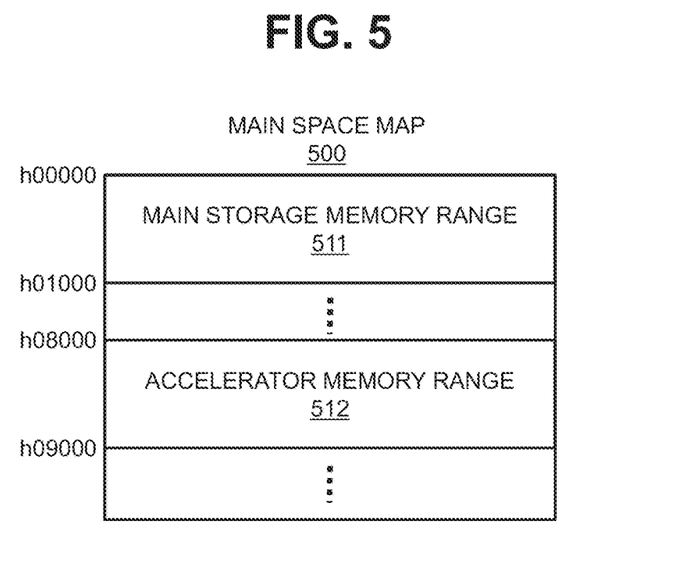
FIG. 5 shows a configuration example of a memory space map.

In addition, data transfer according to the first embodiment can be achieved by the accelerator memory 261 being mapped in a memory space map which is common to all devices connected to the same PCIe bus. According to the example shown in FIG. 5, a memory space map 500 has an accelerator memory range 512 which is a range in which an address space (an example of an address space of a second memory address) provided by the accelerator memory 261 is mapped, in addition to a main storage memory range 511 which is a range in which an address space (an example of an address space of a first memory address) provided by the main storage memory 123 is mapped. The CPU 224 connected to a PCIe bus can designate an address of the accelerator memory 261 as a transfer destination address or a transfer source address in a transfer instruction with reference to the memory space map 500. In this manner, when a memory space can be shared among a plurality of devices, a protocol which is used in data transfer between the devices may be another protocol instead of a PCIe protocol. That is, it is possible to adopt a protocol by which the CPU 224 can recognize (manage) both an address of the main storage memory 123 and an address of the accelerator memory 261. A protocol between the PCIe-SW 122 (an example of a device interface apparatus) and the SSD 111 (an example of an I/O device) may not be a protocol by which the CPU 224 can recognize both the address of the main storage memory 123 and the address of the accelerator memory 261. For example, the SSD 111 is an example of an I/O device that performs communication in accordance with an NVMe protocol, but may be a device that performs communication in accordance with a protocol other than the NVMe protocol, for example, a serial attached SCSI (SAS) protocol. Any of other types of device interface apparatuses, for example, a SAS controller, may be adopted instead of the PCIe-SW 122.

Figure 6:
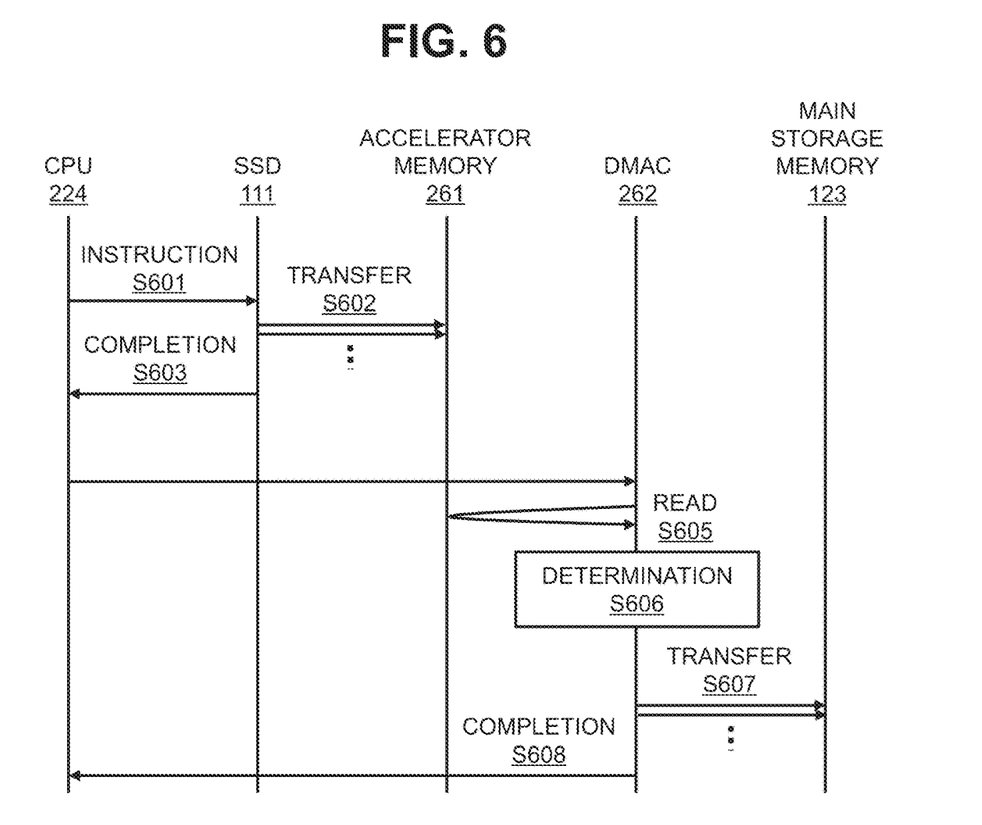
FIG. 6 shows a flow of the overall data transfer according to the first embodiment.
Figure 7:
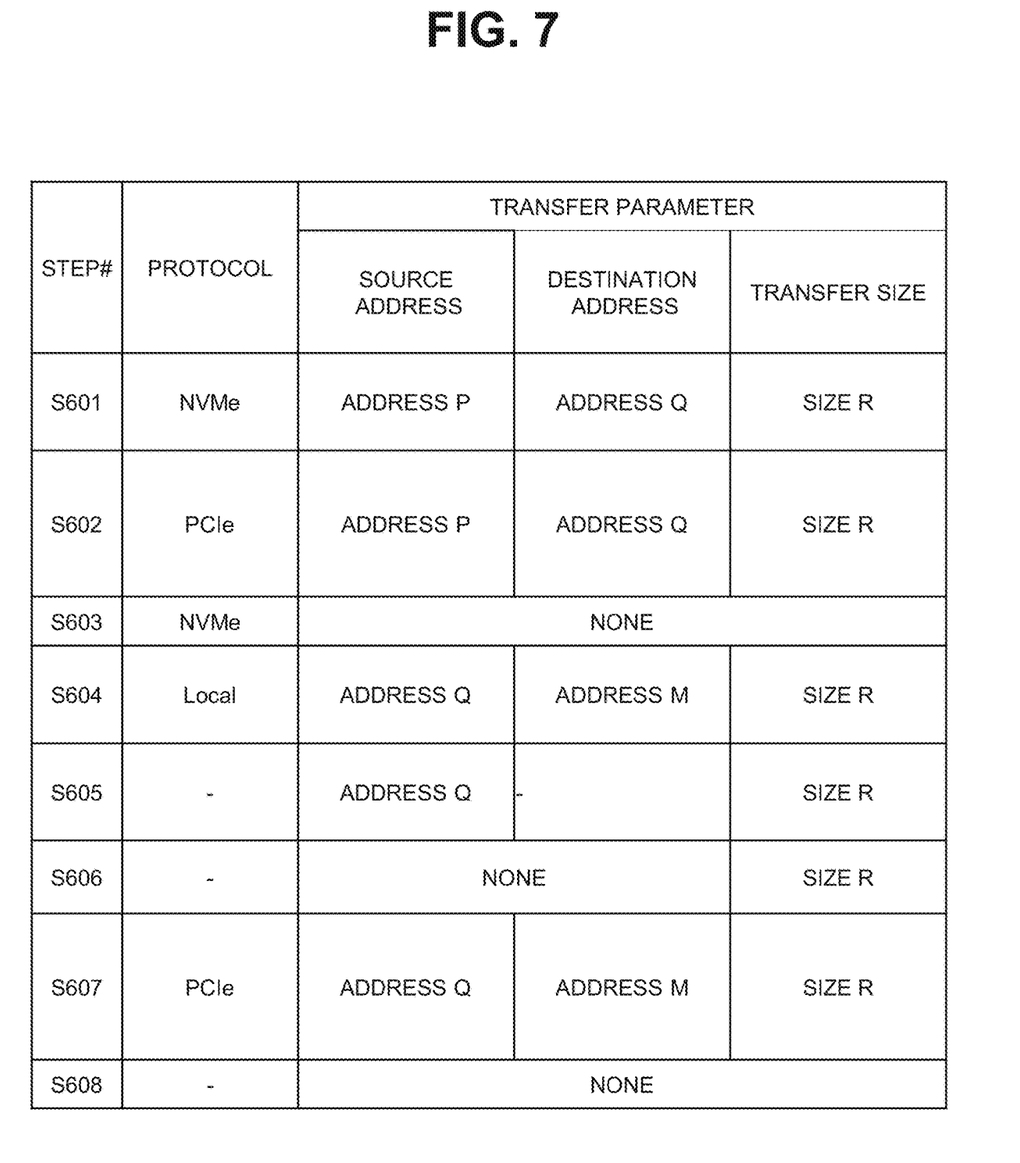
FIG. 7 shows details of a protocol and parameters in the overall data transfer.

FIG. 6 shows a flow of the overall data transfer (data transfer from the SSD 111 to the main storage memory 123) according to the first embodiment. FIG. 7 shows details of a protocol and parameters in the overall data transfer. Meanwhile, in description given with reference to FIGS. 6 and 7, one SSD 111 is taken as an example (hereinafter, in the description given with reference to FIGS. 6 and 7, the SSD will be referred to as a "source SSD 111").

The CPU 224 transmits a first transfer instruction to the source SSD 111 (S601). The first transfer instruction is a transfer instruction for designating the transfer of output target data from the source SSD 111 to the accelerator memory 261. The first transfer instruction is transmitted in accordance with, for example, an NVMe protocol. Further, in the first transfer instruction, a source address, a destination address, and a transfer size are designated as transfer parameters. The source address is an address P of the source SSD 111. The destination address is an address Q of the accelerator memory 261. The transfer size is a size R of output target data (transfer target data).

The source SSD 111 receives the first transfer instruction. The source SSD 111 transfers the output target data from the address P (an address (a source address designated by the first transfer instruction) of the source SSD 111) to the address Q (an address (a destination address designated by the first transfer instruction) of the accelerator memory 261) in a transfer unit size according to data transfer characteristics of the source SSD 111 in response to the first transfer instruction (S602). The data transfer in S602 is performed in accordance with a PCIe protocol.

In a case where the source SSD 111 has finished transferring all of the output target data, this source SSD returns a response indicating completion to the CPU 224 as a response to the first transfer instruction (S603).

The CPU 224 can recognize that the source SSD 111 has finished transferring the output target data to the accelerator memory 261 by receiving the response indicating completion as a response to the first transfer instruction from the source SSD 111. In a case where the CPU 224 has received the response indicating completion, this CPU transmits a second transfer instruction to the DMAC 262 (S604). The second transfer instruction is a transfer instruction for designating the transfer of the output target data from the accelerator memory 261 to the main storage memory 123. The second transfer instruction may be transmitted in accordance with, for example, a local (any) protocol. Further, also in the second transfer instruction, a source address, a destination address, and a transfer size are designated as transfer parameters. The source address is an address Q (an address of the accelerator memory 261 (an address serving as a transfer destination of data from the source SSD 111)). The destination address is an address M of the main storage memory 123. The transfer size is a size R of output target data.

The DMAC 262 receives the second transfer instruction. The DMAC 262 reads data having a size R from the address Q (the address of the accelerator memory 261 (the source address designated by the second transfer instruction)) in response to the second transfer instruction (S605). The DMAC 262 determines one or a plurality of transfer unit sizes of the data (one or a plurality of transfer unit sizes by which the number of occurrences of RMW is minimized) (S606). The DMAC 262 transfers the data to the address M (the address of the main storage memory 123 (the destination address designated by the second transfer instruction)) in the determined one or plurality of transfer unit sizes (S607).

In a case where the transfer of all of the data has been completed, the DMAC 262 returns a response indicating completion to the CPU 224 as a response to the second transfer instruction (S608). The CPU 224 can recognize that the DMAC 262 has finished transferring the output target data to the main storage memory 123 by receiving the response indicating completion as a response to the second transfer instruction from the DMAC 262.

According to the above-described flow of the overall data transfer, in a case where the CPU 224 has received a notification indicating that the data transfer performed in response to the first transfer instruction transmitted in S601 has been completed from the source SSD 111, this CPU transmits the second transfer instruction to the DMAC 262. In this manner, in a case where data transfer at a first stage (data transfer from the source SSD 111 to the accelerator memory 261) has been completed, the next data transfer at a second stage (data transfer from the accelerator memory 261 to the main storage memory 123) can be started.

In addition, according to the above-described flow of the overall data transfer, the first transfer instruction is a transfer instruction for designating the address P to which the source SSD 111 belongs as a source address of output target data and designating the address Q of the accelerator memory 261 as a destination address. The second transfer instruction is a transfer instruction for designating the address Q as a source address and designating the address M of the main storage memory 123 as a destination address. In this manner, two-stage data transfer can be achieved.

Meanwhile, the one or plurality of transfer unit sizes determined in S606 (one or a plurality of transfer unit sizes by which the number of occurrences of RMW is minimized) are constituted by at least one of a partial head size, a partial tail size, and one or more optimal sizes. Details of each of the transfer unit sizes are as described below.

The "partial head size" is a transfer unit size which is adopted in a case where a head address of output target data (a head address (for example, the address M) of a transfer destination (write destination) in the main storage memory 123) is not consistent with a start address of a cache line, and is the size of partial head data. The "partial head data" is data corresponding to an amount from the head address of the output target data to a termination address of the cache line. The size of the partial head data is less than a cache line size.

The "partial tail size" is a transfer unit size which is adopted in a case where a tail address of output target data (a tail address of a transfer destination (write destination) in the main storage memory 123) is not consistent with a termination address of a cache line, and is the size of partial tail data. The "partial tail data" is data corresponding to an amount from the tail address of the output target data to a start address of the cache line. The size of the partial tail data is less than a cache line size.

Each of the "one or more optimal sizes" is the size of at least partial data excluding partial head data and partial tail data in output target data and is the size which is N times (N is a natural number) a cache line size.

In this manner, main data (data other than data corresponding to any of the partial head data and the partial tail data) in the output target data is transferred with an optimal size as a transfer unit size. For this reason, RMW occurs for the data corresponding to any of the partial head data and the partial tail data and does not occur for the main data which is data other than that data. As a result, the number of occurrences of RMW is minimized.

Meanwhile, for example, a value for reducing the number of optimal sizes (for example, the number of optimal sizes is one), in other words, reducing the number of times transfer is performed, may be adopted as the value of N.

Second Embodiment

A second embodiment will be described. In this case, differences from the first embodiment will be mainly described, and the description of points that are common to the first and second embodiments will be omitted or simplified.

Figure 8:
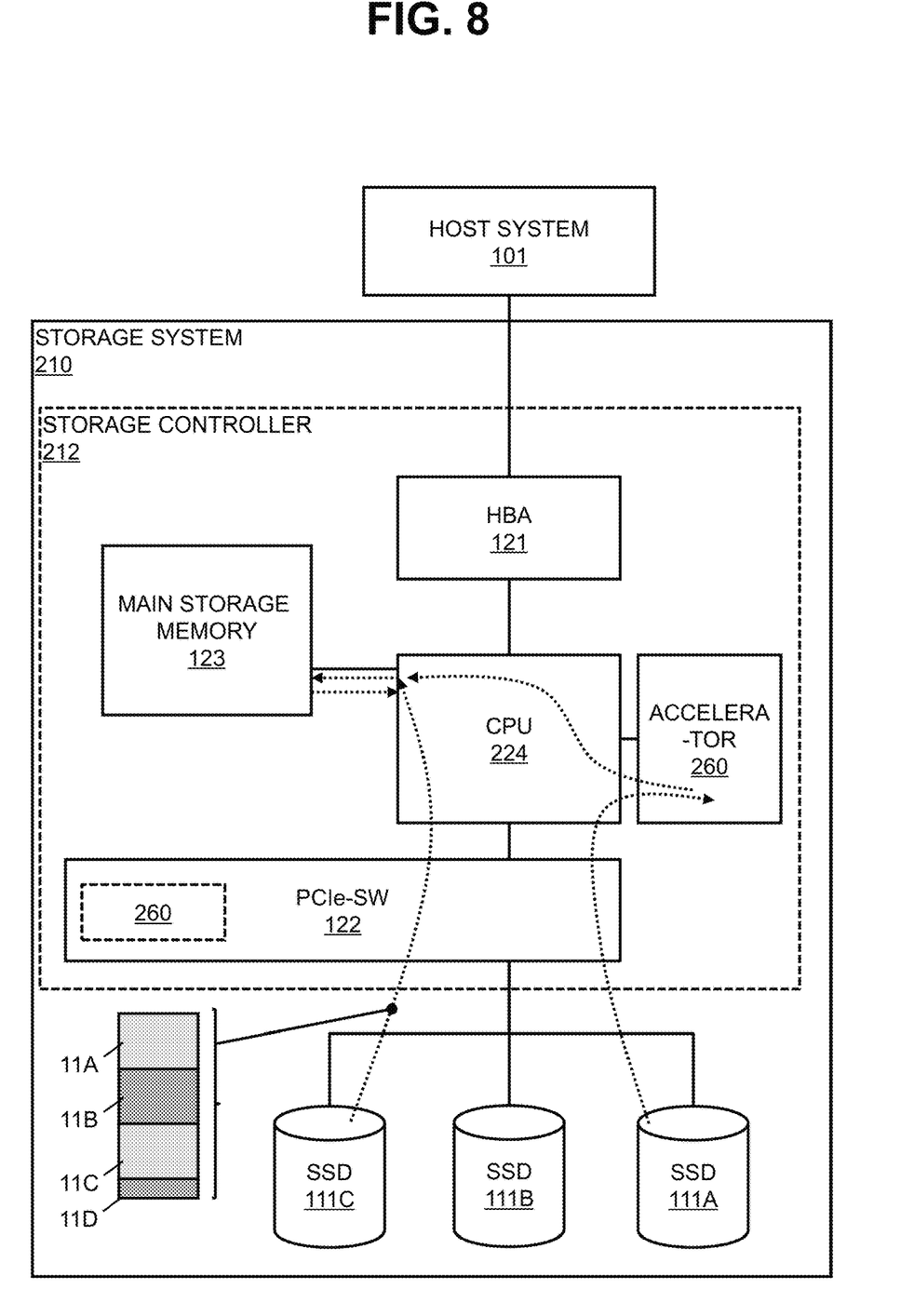
FIG. 8 shows a configuration of an overall system according to a second embodiment.

FIG. 8 shows a configuration of an overall system according to the second embodiment.

An accelerator 260 is connected to a CPU 224 instead of a PCIe-SW 122. In this case, for example, data which is output from an SSD 111A is transferred to the accelerator 260 through the PCIe-SW 122 and the CPU 224. In this manner, in a configuration according to the second embodiment, unlike the configuration according to the first embodiment, data transferred in data transfer at a first stage passes through the CPU 224 in addition to the PCIe-SW 122. On the other hand, according to the configuration of the first embodiment, data transferred in data transfer at a first stage passes through the PCIe-SW 122 but does not pass through the CPU 224. For this reason, the configuration according to the first embodiment is more preferable in that a flow rate of data in the CPU 224 is low. Meanwhile, the accelerator 260 may be connected to any one device (for example, an HBA 121) among devices that can perform communication through PCIe in a storage system 210 or may be included in any one device (for example, the PCIe-SW 122 as shown in the drawing) among devices that can perform communication through PCIe.

In addition, whether to perform two-stage transfer or one-stage transfer may be determined in advance in accordance with whether or not data transfer characteristics of an SSD 111 which is a transfer source are the same as data transfer characteristics of a DMAC 262. For example, the details thereof are as described below. Thereby, performance deterioration is expected to be further reduced.

Two-stage transfer is adopted for the SSD 111A having data transfer characteristics different from the data transfer characteristics of the DMAC 262. That is, when a source SSD 111 is the SSD 111A, the CPU 224 designates an address of an accelerator memory 261 as a destination address in a first transfer instruction for the SSD 111A.

One-stage transfer is adopted for an SSD 111C having the same data transfer characteristics as the DMAC 262. That is, when a source SSD 111 is the SSD 111C, the CPU 224 designates an address of a main storage memory 123 as a destination address in a first transfer instruction for the SSD 111C.

Third Embodiment

A third embodiment will be described. In this case, differences from the first and second embodiments will be mainly described, and the description of points that are common to the first and second embodiments will be omitted or simplified.

Figure 9:
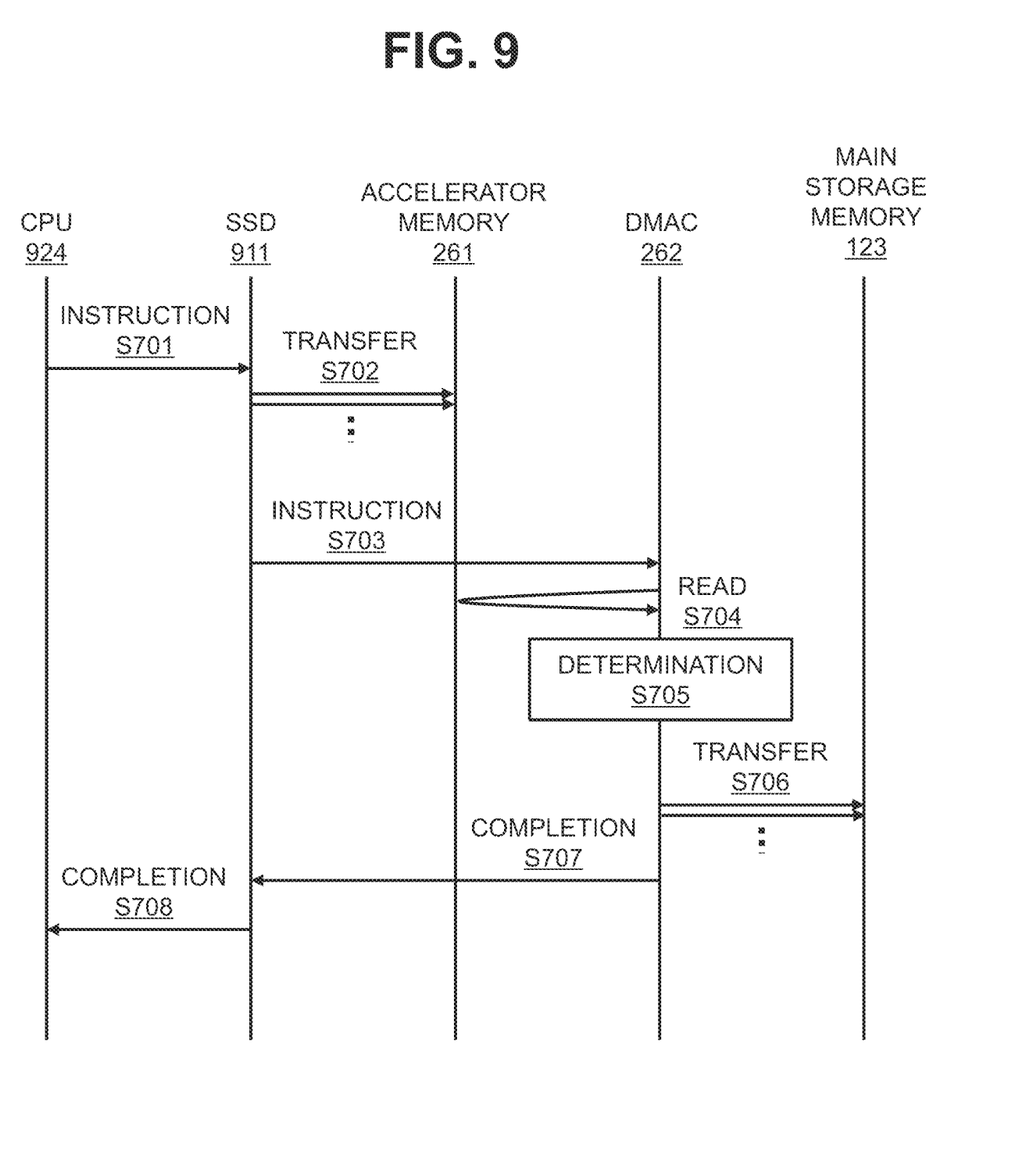
FIG. 9 shows a flow of the overall data transfer according to a third embodiment.

FIG. 9 shows a flow of the overall data transfer according to a third embodiment.

According to the third embodiment, a CPU 924 is adopted instead of the CPU 224, and an SSD 911 is adopted instead of the SSD 111. A second transfer instruction is transmitted by the SSD 911.

Specifically, for example, the CPU 924 transmits a first transfer instruction to a source SSD 911 (S701). The first transfer instruction may be an instruction for transferring output target data from an accelerator memory 261 to a main storage memory 123 in addition to transferring output target data from the source SSD 911 to the accelerator memory 261, that is, an instruction for two-stage data transfer. For example, the first transfer instruction may include a first address set (a source address and a destination address for data transfer at a first stage) and a second address set (a source address and a destination address for data transfer at a second stage) as a source address and a destination address.

The source SSD 911 transfers output target data from the source SSD 911 to the accelerator memory 261 in accordance with the first address set in response to the first transfer instruction (S702).

In a case where the source SSD 911 has completed the data transfer in S702, this source SSD transmits the second transfer instruction to the DMAC 262 (S703). The second transfer instruction includes the above-described second address set. In a case where the DMAC 262 has received the second transfer instruction, the same processes as S605 to S607 are performed (S704 to S706).

In a case where the DMAC 262 has completed S706, this DMAC returns a response indicating completion to the source SSD 911 as a response to the second transfer instruction (S707). In the present embodiment, a transmission source of the second transfer instruction is the source SSD 911, and thus the completion response is returned to the source SSD 911.

In a case where the source SSD 911 has received the response indicating completion from the DMAC 262 as a response to the second transfer instruction, this source SSD returns the response indicating completion to the CPU 924 as a response to the first transfer instruction (S708).

According to the third embodiment, the number of processes related to the CPU 924 in two-stage data transfer is smaller than that in the first embodiment, and thus the load of the CPU 924 can be expected to be reduced.

Although some embodiments have been described above, these are examples for describing the present invention and are not intended to limit the scope of the present invention to only these embodiments. The present invention can also be implemented in various other forms.

What is claimed is:

1. A data transfer system comprising:
   one or a plurality of input/output (I/O) devices;
   a first memory providing an address space of a first memory address;
   a processor writing data into the first memory in units of cache lines, which are fixed and predetermined unit areas of the first memory;
   a second memory providing an address space of a second memory address; and
   a direct memory access (DMA) controller performing DMA-transfer of data,
   wherein the processor performs, for data which has a size less than a cache line size and in which a portion of a cache line is a write destination, read-modify-write (RMW) including reading data having a cache line size from an entire region of the cache line, and modifying a portion of the data having the cache line size to data having a size less than the cache line size, and writing in the cache line the modified data having a cache line size,
   wherein the processor transmits to a source I/O device, which is an output source of data, among the one or plurality of I/O devices, a first transfer instruction, which designates transfer of output target data from the source I/O device to the second memory, and
   wherein the DMA controller transfers the output target data, transferred from the source I/O device to the second memory in response to the first transfer instruction, from the second memory to the first memory in a plurality of transfer unit sizes, in response to a second transfer instruction from the processor to the DMA controller for designating transfer of the output target data from the second memory to the first memory,
   wherein the plurality of transfer unit sizes of the output target data transferred by the DMA controller to the second memory is configured of at least two of a partial head size, a partial tail size, and one or more optimal sizes,
   wherein the partial head size is one of the plurality of transfer unit sizes upon the processor determining a head first memory address of the output target data is not consistent with a start address of a first memory address of a cache line, and the partial head size is an amount from the head first memory address of the output target data to a termination first memory address of the cache line,
   wherein the partial tail size is one of the plurality of transfer unit sizes upon the processor determining a tail first memory address of the output target data is not consistent with a termination first memory address of a cache line and, the partial tail size is an amount from the tail first memory address of the output target data to a start first memory address of the cache line, and
   wherein the each of the one or more optimal sizes is a size of at least partial data excluding the partial head data and the partial tail data in the output target data and is a size which is N times (N is a natural number) a cache line size.

2. The data transfer system according to claim 1, wherein the plurality of I/O devices share the second memory and the DMA controller.

3. The data transfer system according to claim 2, wherein the plurality of I/O devices are a plurality of I/O devices and having different data transfer unit sizes including a transfer unit size,
   when the source I/O device is an I/O device having a data transfer unit size different from a data transfer unit size of the DMA controller, the processor designates the second memory as a transfer destination in the first transfer instruction for the I/O device, and
   when the source I/O device is an I/O device having the same data transfer unit size as the data transfer unit size of the DMA controller, the processor designates the first memory as a transfer destination in the first transfer instruction for the I/O device.

4. The data transfer system according to claim 1, wherein
   the first transfer instruction is a transfer instruction for designating an address, to which the source I/O device belongs, as a source address of the output target data and designating a first second memory address as a destination address, and
   the second transfer instruction is a transfer instruction for designating the first second memory address as a source address and designating a first memory address as a destination address.

5. The data transfer system according to claim 1, wherein, in a case where the processor receives from the source I/O device a notification indicating that the data transfer performed in response to the first transfer instruction has been completed, the processor transmits the second transfer instruction to the DMA controller.

6. The data transfer system according to claim 1, further comprising a bus to which the first memory and the second memory belong, wherein
   an address space of the second memory is mapped in an address space shared by devices belonging to the bus, in addition to an address space of the first memory.

7. The data transfer system according to claim 1, further comprising a device interface apparatus to which the plurality of I/O devices are coupled, wherein
   the second memory and the DMA controller are coupled to the device interface apparatus, and
   the output target data transferred from the source I/O device to the second memory passes through the device interface apparatus and does not pass through the processor.

8. A data transfer method performed by an accelerator supporting transfer of data to a first memory, in which data is written in units of cache lines which are unit areas, the data transfer method comprising:
   receiving a second transfer instruction for designating transfer of output target data from a second memory to the first memory, the output target data being output from an I/O device and written into the second memory in response to a first transfer instruction for designating transfer of the output target data to the second memory; and
   transferring the output target data from the second memory to the first memory in a plurality of transfer unit sizes, in response to the second transfer instruction,
   wherein the plurality of transfer unit sizes of the output target data transferred by the DMA controller to the second memory is configured of at least two of a partial head size, a partial tail size, and one or more optimal sizes,
   wherein the partial head size is one of the plurality of transfer unit sizes upon the processor determining a head first memory address of the output target data is not consistent with a start address of a first memory address of a cache line, and the partial head size is an amount from the head first memory address of the output target data to a termination first memory address of the cache line, wherein the partial tail size is one of the plurality of transfer unit sizes upon the processor determining a tail first memory address of the output target data is not consistent with a termination first memory address of a cache line and, the partial tail size is an amount from the tail first memory address of the output target data to a start first memory address of the cache line, and wherein the each of the one or more optimal sizes is a size of at least partial data excluding the partial head data and the partial tail data in the output target data and is a size which is N times (N is a natural number) a cache line size.

9. An accelerator supporting transfer of data to a first memory in which data is written in units of cache lines which are unit areas, the accelerator comprising:

a second memory; and a direct memory access (DMA) controller performing DMA-transfer of data, wherein the second memory receives output target data, which is output from an I/O device in response to a first transfer instruction for designating transfer of the output target data to the second memory, from the I/O device, and the DMA controller transfers the output target data from the second memory to the first memory in a plurality of transfer unit sizes, by which the number of occurrences of read modify write (RMW) in the first memory by a processor is minimized, in response to a second transfer instruction for designating transfer of the output target data from the second memory to the first memory wherein the plurality of transfer unit sizes of the output target data transferred by the DMA controller to the second memory is configured of at least two of a partial head size, a partial tail size, and one or more optimal sizes, wherein the partial head size is one of the plurality of transfer unit sizes upon the processor determining a head first memory address of the output target data is not consistent with a start address of a first memory address of a cache line, and the partial head size is an amount from the head first memory address of the output target data to a termination first memory address of the cache line, wherein the partial tail size is one of the plurality of transfer unit sizes upon the processor determining a tail first memory address of the output target data is not consistent with a termination first memory address of a cache line and, the partial tail size is an amount from the tail first memory address of the output target data to a start first memory address of the cache line, and wherein the each of the one or more optimal sizes is a size of at least partial data excluding the partial head data and the partial tail data in the output target data and is a size which is N times (N is a natural number) a cache line size.

* * * * *